No. 612,207. Patented Oct. 11, 1898.
J. G. KINCAID & W. CROCKATT.
SEPARATOR.
(Application filed Dec. 28, 1897.)
(No Model.) 4 Sheets—Sheet 1.

No. 612,207. Patented Oct. 11, 1898.
J. G. KINCAID & W. CROCKATT.
SEPARATOR.
(Application filed Dec. 28, 1897.)
(No Model.) 4 Sheets—Sheet 2.

Witnesses:
Inventors:
John George Kincaid
William Crockatt
By Richards
Their Attorneys No. 612,207. Patented Oct. 11, 1898.
G. KINCAID & W. CROCKATT.
SEPARATOR.
(Application filed Dec. 28, 1897.)
(No Model.) 4 Sheets—Sheet 3.
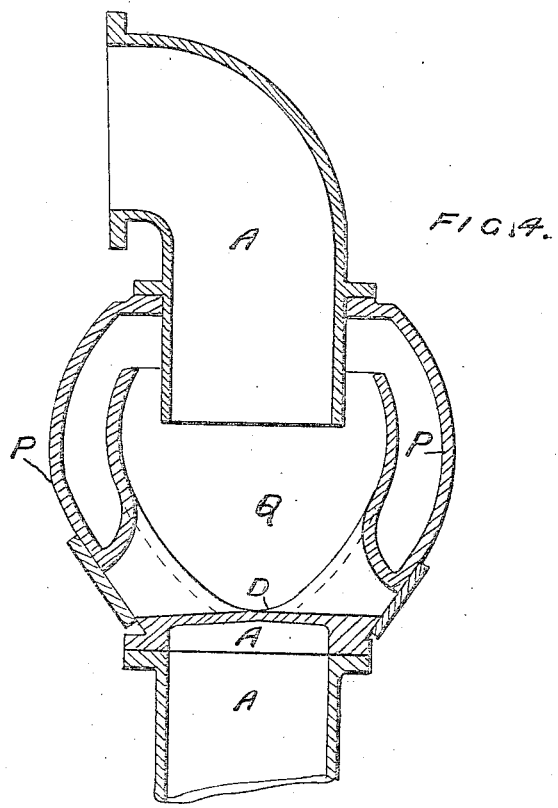
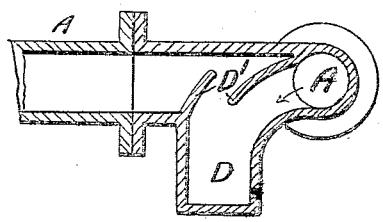

No. 612,207. Patented Oct. 11, 1898.
J. G. KINCAID & W. CROCKATT.
SEPARATOR.
(Application filed Dec. 28, 1897.)
(No Model.) 4 Sheets—Sheet 4.
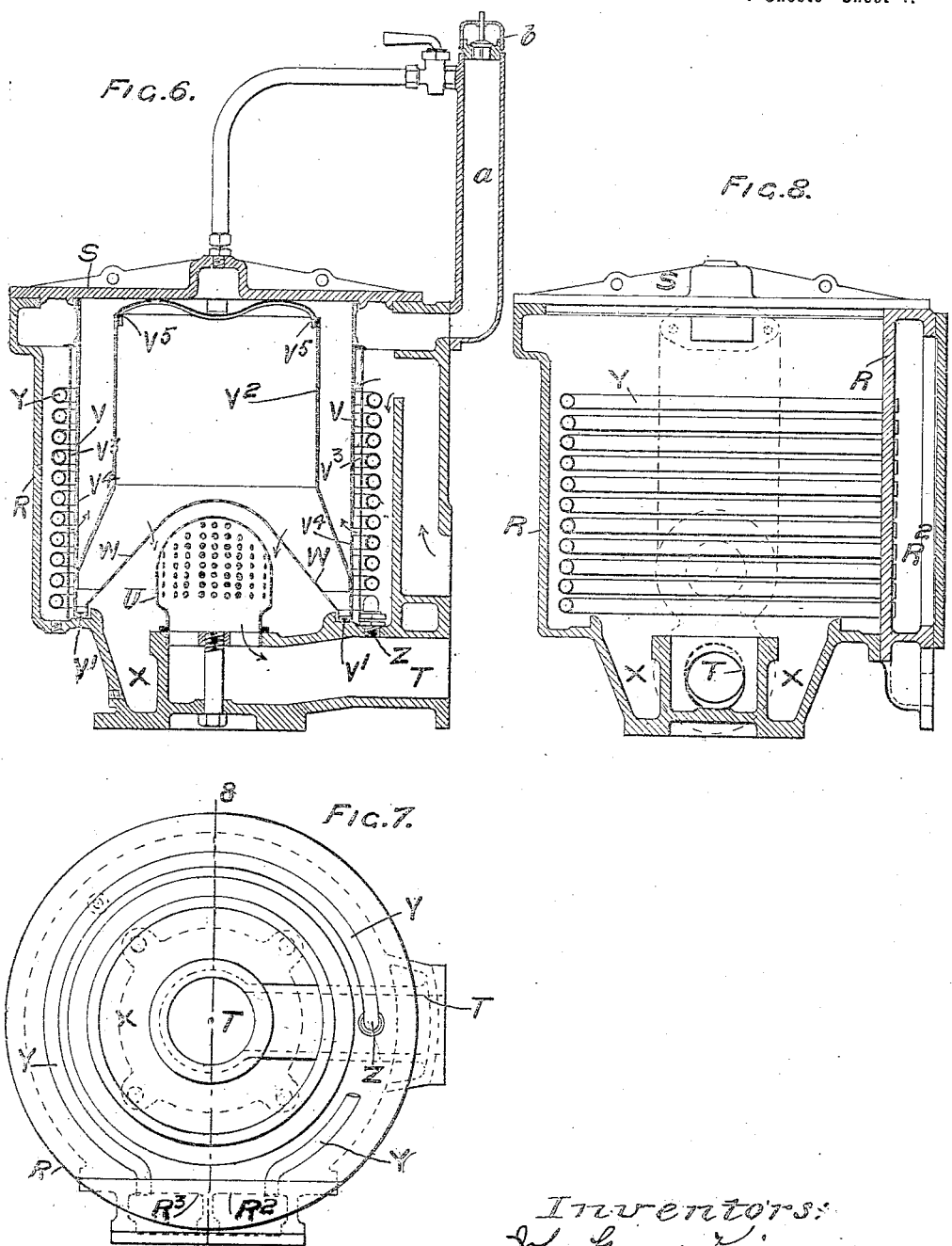

UNITED STATES PATENT OFFICE.

JOHN GEORGE KINCAID, OF GREENOCK, AND WILLIAM CROCKATT, OF GLASGOW, SCOTLAND.

SEPARATOR.

SPECIFICATION forming part of Letters Patent No. 612,207, dated October 11, 1898.

Application filed December 28, 1897. Serial No. 663,937. (No model.) Patented in England July 2, 1894, No. 12,784.

*To all whom it may concern:*

Be it known that we, JOHN GEORGE KINCAID, engineer, of Oakfield, Greenock, county of Renfrew, and WILLIAM CROCKATT, engineer, of 21 Hope street, in the city of Glasgow, Scotland, have invented certain new and useful improvements in apparatus for separating oil, grease, or other extraneous matter from exhaust-steam and feed-water, (which have been patented in Great Britain by Letters Patent dated July 2, 1894, No. 12,784,) of which the following is a specification.

This invention relates to apparatus for separating oil or greasy matter from the exhaust-steam on its passage from the engine-cylinder to the condenser and from the hot-well to the feed-pump supplying the boiler, the object of the invention being to prevent the admission of oil or grease to the condenser or to the feed-water.

Figure 1:
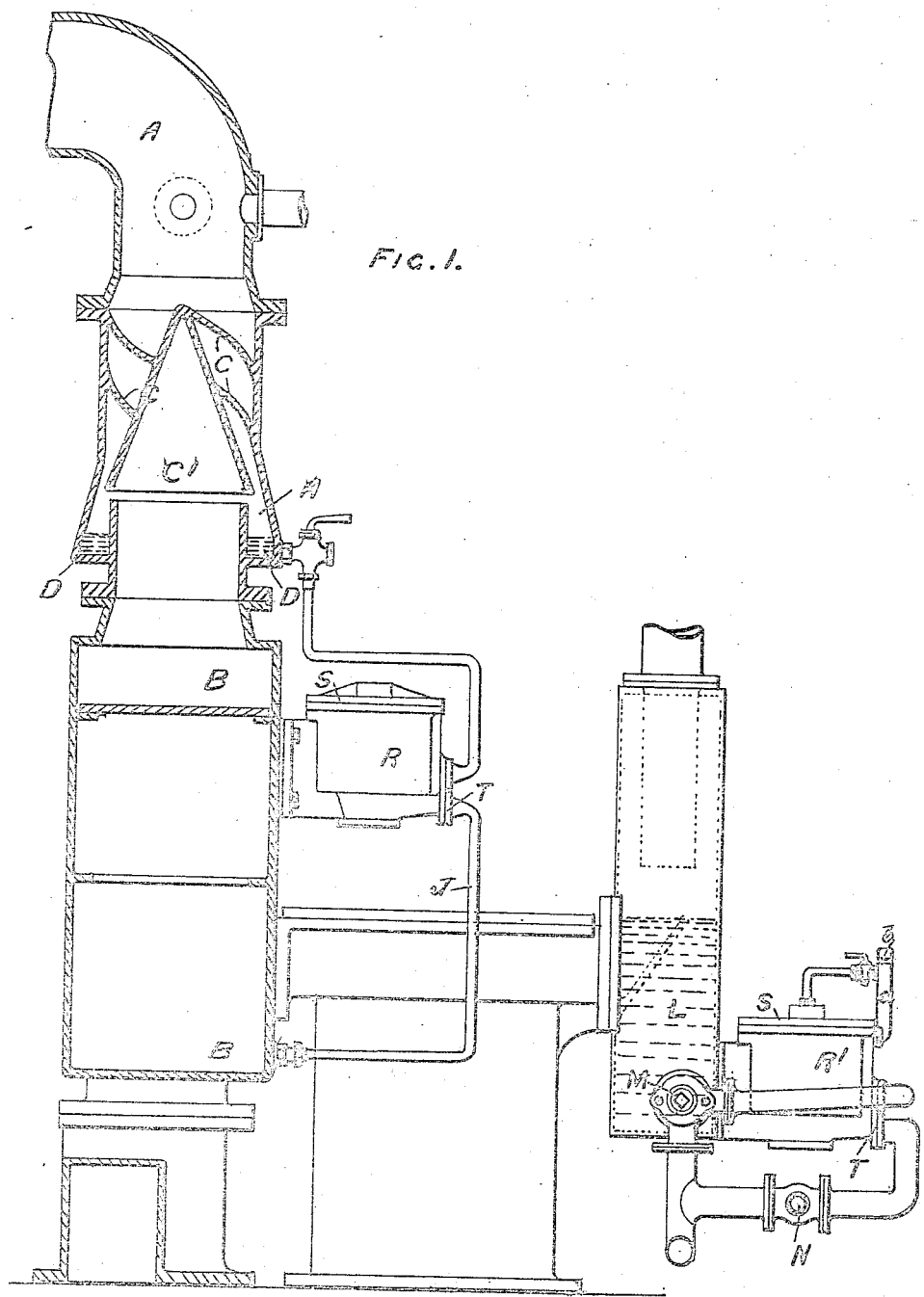

In the accompanying drawings, which illustrate the invention, Figure 1 is a vertical section of a condenser and the exhaust-pipe leading thereto from a steam-engine and showing the arrangement by means of which the oil or grease is separated from the exhaust-steam and the oil is filtered or removed from the condensation-water and from the feed-pump suction. Figs. 2, 3, 4, and 5 are sectional views showing various modifications of the oil-separating device as fitted in exhaust-pipes connecting the engine and condenser and designed to be used in conjunction with a filter, as in Fig. 1. Fig. 6 is a vertical section of the improved filter used in conjunction with the oil-separator in the exhaust-pipe for removing greasy matter in the water delivered to the condenser and in the water passing therefrom to the feed-pump suction. Fig. 7 is a plan of the same with the top cover removed, and Fig. 8 is a vertical section taken as at the line S S in Fig. 7.

The exhaust-pipe A, leading from the low-pressure cylinder of an engine to the condenser B, is formed with an internal helical vane C or a series of such vanes, the effect of which is to set up a rotary motion of the steam passing through the pipe A, whereby any oil or greasy matter is thrown by centrifugal action upon the sides of the pipe A and is collected in a trap or like chamber D, formed at the lower end of the exhaust-pipe A, at or near the point where the pipe is connected to the condenser B, a cone C' being formed under the helical vanes to direct any oily matter from the vanes into the trap instead of allowing it to drip into the condenser. From this collector D the oil or grease and water of condensation are drained off by a pipe E into a filter-chamber R, having fitted in it a filter-cylinder V, of the construction hereinafter described and which is connected by a pipe J to the lower part of the condenser B, the existence of a vacuum in which has the effect of creating a suction upon the contents of the filter, whereby the water of condensation is drawn through the filter to the condenser B, leaving the oil or greasy matter on the filtering-cloth or in the filter, from which it may be periodically withdrawn. A second filter, of similar construction, fitted in a filter-chamber R' is or may be provided, in connection with the hot-well L, to intercept any oil or greasy matter that may remain in the feed-water after leaving the air-pump. Between the hot-well L and this filter-chamber R' a cock M is introduced, by means of which the feed-water may be directed either through the filter or direct to the pump-suction. A second cock N may be provided for shutting off the filter when changing the filter material. For the purpose of allowing air to escape the cover S of the filter-chamber R' is provided with an air-relief cock a, led to the condenser when the filter is on suction side of pump. This filter R may be used as attached to the hot-well L in cases in which the centrifugal oil-separator in the exhaust-steam pipe A is not employed.

Figure 2:
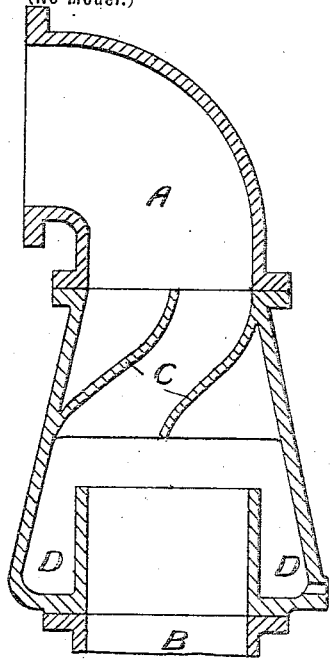

In the oil-separator (represented at Fig. 1 as fitted in the exhaust-pipe leading to the condenser) the hollow cone or bell C' is formed with its base of larger diameter than the inlet to the condenser B, so that as the exhaust-steam impinges thereon and partial condensation takes place the oily matter carried forward by the steam will be thrown outward and downward and drip from the lower edge of the cone C' into the trap or collector D, formed around the mouth or inlet to the condenser, ample area or room for the passage of the steam around the lower edge of the cone being left between it and the condenser-mouth. The cone C' may in some cases be dispensed with, the helical vanes only being employed, as shown at Fig. 2, to effect the separation of the grease from the exhaust-steam.

Figure 3:
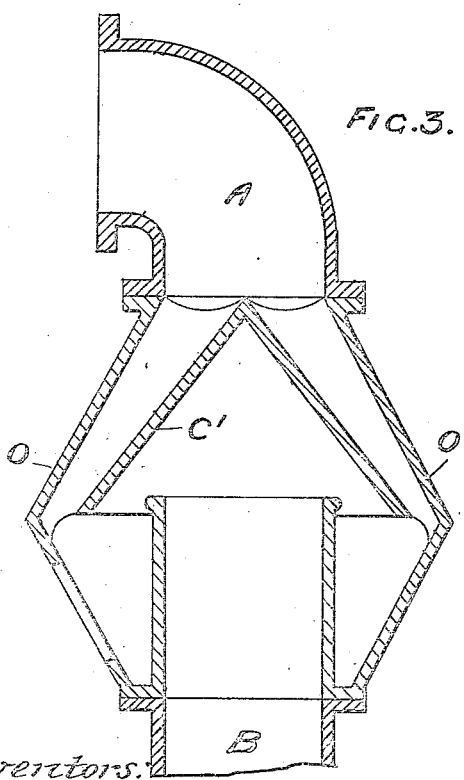

In the modification of oil-separator illustrated by Fig. 3, in which the helical vanes are entirely replaced by the cone or bell C', the exhaust-pipe A or a trunk or casing forming part of its length is bulged or widened to a cowl-like form, as at O, to permit of the use of a cone C' of diameter sufficient to fully cover the condenser mouth or inlet, while leaving ample space for the passage of the steam between the exhaust-pipe A and cone C' and between the lower edge of the latter and the condenser-mouth, which extends upward into the exhaust-passage, to form a deep annular trap or collector D for the oil and water.

In another modification of the oil-separator (illustrated at Fig. 4) a hollow and approximately spherical chamber P is fitted or formed in the length of the exhaust-pipe A and has formed within it a deep bowl Q, whereinto the exhaust-pipe A extends, and the oily matter is deposited and collected, while the purified steam passes into the annular space around the bowl and down a continuation of the exhaust-pipe A or direct into the condenser.

In a further modification the oil separator or collector is formed by breaking the continuity of the exhaust-pipe or interposing a trap in its length. One portion of the length of the exhaust-pipe is terminated in a chamber which serves as the trap or collector for the oil or greasy matter, while the continuation of the exhaust-pipe extends from a point in this chamber above the level of the collecting oil and the termination of the first part of the pipe, so that the steam is deflected in its course toward the condenser, the ends of the exhaust-pipe taking the form of louver or baffle plates. This construction may, as shown at Fig. 5, be readily adapted to horizontal exhaust-pipes, in which a chamber D is formed to depend from a portion of the length of the exhaust-pipe A, and baffle-plates D' are formed in the pipe above to deflect the exhaust downward into the collector-chamber D and prevent its direct flow therefrom toward the condenser.

In all the above modifications the bottom of the collector D is connected to a specially-arranged filter, hereinafter described, through which the condensed steam is returned to be condensed and any oil or greasy matter carried along with it efficiently trapped.

The improved filter is composed of a cylindrical or other casing R, having at top end a tightly-fitted removable cover S and at the lower or opposite end a central discharge-pipe T, the inner end of which is fitted with a rose U, over which may be drawn a hood of suitable material to intercept any trace of grease or grit that may pass through the filter-box. Over this outlet-pipe is fitted a removable annular box V, of sheet metal or other light material, and made up of one, two, or more compartments, preferably concentric, and either fitted with a lid held in place by the outer cover of filter or so fitted that the outer cover S of the filter forms the lid and presses the annular box down against a water-tight joint V' on bottom of filter. This box V, which is adapted to hold the clinker, coke, charcoal, slag, or other suitable filtering medium in a loose mass, may if of one compartment be perforated at top end or through the lid. If of two or more compartments, it may be perforated at the lower part of its outer shell, as shown at $V^4$, Fig. 6, to admit the water from the casing to the outer compartment and up through the filtering medium to the upper end $V^5$ of the partition separating the compartments. The partially-filtered water flows over the top of this partition into the next compartment $V^2$, passing downward through the filtering material therein, and thence, if there be only two compartments, flows out through perforations W in the lower part of the inner shell into an annular space X, around the outlet-pipe T, into which it escapes or is drawn, the outlet-pipe being connected to the suction or to the discharge of the feed-pump.

If it is required to heat the feed-water then in the water-space surrounding the filter-box, a number of steam-pipes Y are fitted within the casing and are each made preferably of horseshoe form, as shown at Fig. 7, the ends of the pipes Y being connected at one side to a pocket or space R', into which steam is admitted from an evaporator or other source, while the other ends are connected to an adjoining pocket $R^2$, which receives water of condensation and may discharge it into the filter-casing or directly into discharge-pipe of filter, as shown at Z. A cylindrical casing $V^3$ is preferably fitted around the box V, this casing being perforated only at the top, so that the water to be filtered will always cover the heating-pipes Y. The effect of so heating the feed-water is to cause separation of the air present, which rises to the surface of the casing of the filter. To provide for its removal, an air vessel $a$ is fitted to the upper part of the casing the top of which is connected to the condenser. On the top of this air vessel is likewise fitted an overflow-valve $b$, lightly loaded with a spring which acts as a telltale should the filter be neglected and allowed to get choked.

The filtering medium may be readily renewed after use by removing the cover S of filter-casing and withdrawing the filter-box V, which is simply emptied out and refilled with clinker or other suitable filtering medium.

A steam connection is preferably provided to the interior of the filter, by which the grease may be blown out of the filtering material and drained away through a cock at the bottom of the filter-casing.

Having now described the invention, what we claim, and desire to secure by Letters Patent, is—

In a device for separating oil, grease and similar matter from exhaust-steam, the combination of an exhaust-steam pipe A connected to a condenser and fitted internally with a helical vane-cone or like deflector C, a trap D for collecting the oil and water separated from the steam in said exhaust-pipe, a filter connected at its outer part to the collecting-trap and at its inner part to said condenser, and serving to separate the grease from the water and to direct the filtered water of condensation into the condenser substantially as described.

Signed at Glasgow, Scotland, this 16th day of December, 1897.

JOHN GEORGE KINCAID.
WILLIAM CROCKATT.

Witnesses:
WALLACE FAIRWEATHER,
JNO. ARMSTRONG, Jr.